Figure 1:
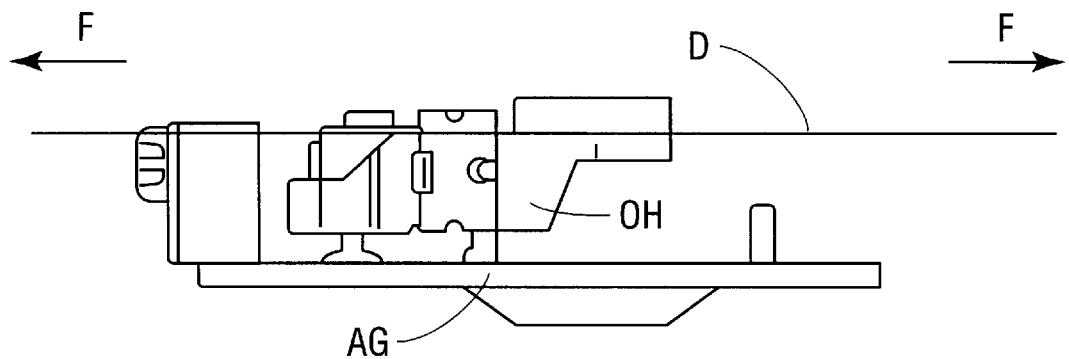

United States Patent
Suzuki et al.

[11] Patent Number: 5,911,847
[45] Date of Patent: Jun. 15, 1999

[54] METHOD AND DEVICE FOR PRODUCING A SCANNING DEVICE FOR OPTICAL RECORDING MEDIA

[75] Inventors: Tsuneo Suzuki, Mönchweiler; Reiner Baas, Steinach, both of Germany

[73] Assignee: Deutsche Thomson-Brandt GmbH, Villingen-Schwenningen, Germany

[21] Appl. No.: 08/991,163

[22] Filed: Dec. 16, 1997

[30] Foreign Application Priority Data

Nov. 20, 1997 [DE] Germany .......................... 197 51 378

[51] Int. Cl.[6] .................. B32B 31/00; G11B 7/08
[52] U.S. Cl. .............. 156/161; 156/494; 369/44.15; 359/813
[58] Field of Search ................. 156/161, 494; 228/203, 212, 213; 359/813, 819; 369/44.15

[56] References Cited

U.S. PATENT DOCUMENTS

| | | | |
|---|---|---|---|
| 5,056,891 | 10/1991 | Masunaga | 359/813 |
| 5,264,968 | 11/1993 | Masunaga | 359/814 X |
| 5,556,018 | 9/1996 | Kanehira | 225/2 |
| 5,646,789 | 7/1997 | Lee | 359/814 |
| 5,734,638 | 3/1998 | Matsui | 369/44.15 |

*Primary Examiner*—Jeff H. Aftergut
*Assistant Examiner*—Shawn A. Mitchell
*Attorney, Agent, or Firm*—Joseph S. Tripoli; Eric P. Herrmann

[57] ABSTRACT

The invention relates to a method and a device for producing a scanning device, also termed a pick-up, for optical recording media, which can be produced with a low outlay and thus cost-effectively, and in comparative terms has a low tilt of the objective lens and improved guidance properties. According to the invention, during the connection of an objective lens holder and actuator base plate, a prestress is applied to wires provided as elastic support of the objective lens holder on an actuator base plate. Scanning devices produced according to the invention for optical recording media have a low tilt of the objective lens and improved guidance properties.

10 Claims, 3 Drawing Sheets

METHOD AND DEVICE FOR PRODUCING A SCANNING DEVICE FOR OPTICAL RECORDING MEDIA

The invention relates to a method and a device for producing a scanning device, also termed a pick-up, for optical recording media, which can be produced with a low outlay and thus cost-effectively, and in comparative terms has a low tilt of the objective lens and improved guidance properties.

Scanning devices for optical recording media in laser disc and compact disc players are generally known. The design and function of an optical scanning device, a so-called optical pick-up, are described in Electronic Components & Applications, Vol. 6, No. 4, 1984, pages 209 to 215. Such scanning devices have a so-called actuator on which there is arranged an objective lens provided for track guidance and for focusing the light beam or laser beam on the optical recording medium. Basically, it is possible to distinguish between optical scanning devices in terms of the type of suspension of the objective lens. Thus, for example, in a known leafspring actuator the objective lens holder is fastened to a frame by means of four parallel leaf springs, cf. EP-A 0 178 077. It is disadvantageous that such spring arrangements have an undesirable tendency to vibrate and require a high outlay on assembly. Parallel guidance of the objective lens holder is also achieved by means of an actuator of the articulated or hinged type, as disclosed, for example, in EP-B 0 563 034. An actuator with parallel guidance proves to be relatively stable with regard to tilting of the objective lens during deflection, but it does require a high outlay on adjustment since it has to be exactly aligned with regard to the directions of movement which are guided by means of articulations.

A further type of elastic support of the objective lens holder consists in using four wires which connect the objective lens holder to the actuator base plate. So-called wire pick-ups can be produced more cost-effectively by comparison with optical scanning devices with a leaf spring or articulation. However, by comparison with other parallel guidances a wire pick-up proves to be disadvantageous with regard to tilting of the objective lens and its guidance properties.

It is the object of the invention to specify a method and a device for producing cost effective scanning devices for optical recording media which, as far as possible, avoid the disadvantages of so-called wire pick-ups.

This object is achieved by means of the features specified in the main claims. Advantageous embodiments and developments are specified in subclaims.

It is an aspect of the invention to avoid as far as possible the disadvantages of so-called wire pick-ups by comparison with other parallel guidances with regard to tilting of the objective lens and asymmetrical guidance properties. In this connection, it has been found that prestressing the wires of the wire pick-up, which form an elastic support of the objective lens holder, has the result of a lower tilting of the objective lens and improved guidance properties. The prestressing of the wires of the wire pick-up relates, in particular, to the mounting process of the wire actuator. In the wire pick-up, an objective lens holder is connected to an actuator base plate via four wires which are likewise provided for supplying power to the coils, arranged on the objective lens holder, for focusing and track guidance. It is preferred to use wires consisting of copper which are connected to the objective lens holder and the actuator base plate by soldering. Since it has been found that the properties of a wire actuator or a wire pick-up improve by prestressing the wires of the wire pick-up during mounting, it is to be assumed that stresses in the elastic support which is formed by four soldered-on wires can be regarded, in particular, as the cause of the disadvantageous properties of the wire pick-up. It can be demonstrated that the solidifying solder exerts on the wires, which generally have a diameter in the region of 0.1 mm, forces which are seen as internal stresses in the elastic support. Since the cooling process and the solidifying phase of the solder occur differently, inter alia because of different amounts of solder at the soldering points, it is to be assumed that there is an irregular counterforce upon deflection of the actuator from its rest position and tilting of the objective lens. This then disadvantageously leads in a CD player or similar optical recording or reproducing unit to a reduced quality of recording and reproduction and to asymmetrical loading of the control loops. The proposed method of prestressing the wires of the wire pick-up during mounting advantageously counteracts forces which result from the solidifying process of the solder connecting the wires to the objective lens holder or to the actuator base plate, thus achieving low tilting of the objective lens and improved guidance properties of the wire pick-up. Thus, using the specified method it is possible to produce, in a cost effective fashion, scanning devices for optical recording media which as far as possible avoid the disadvantages of known wire pickups despite being designed as wire pick-ups.

Instead of prestressing, in accordance with a further embodiment a force is exerted at a connecting point of the wire which is selected to have magnitude and direction such that the wire is essentially straightened. The wire is thus slightly stressed and does not sag, or does so only negligibly. The wire is advantageously stressed only so slightly that there is no, or only a slight structural deformation. This minimizes the probability of a later occurrence of a break at the connecting point. Depending on the material properties or other conditions, it can, however, also be expedient to accept a slight structural deformation or even to arrange for one purposely. The said force is preferably a force caused by the connecting operation. For example, in the case of a soldered joint the contraction of the solder tin is used to produce this force, and a contraction of the adhesive which occurs in the case of a bonded joint, for example in the case of a hardening process induced by heat treatment, can also be used to produce the force in the preferred direction. In this case, an automatic machine is advantageously used to produce the joint, since this ensures extensive uniformity of the joint produced and thus of the force.

A mounting device which has a mount for the actuator base plate and a mount for the objective lens holder is provided as a device for producing cost effective scanning devices for optical recording media. The mount for the actuator base plate is preferably formed from pins which engage in openings in the actuator base plate which are provided for later fastening and aligning of the actuator base plate on the coarse drive. The objective lens holder, which generally does not have such openings, is preferably fixed in the device by means of a hold-down. In order to connect the objective lens holder to the actuator base plate, a first wire is then threaded into an opening provided in the actuator base plate and guided in the direction of a soldering point provided on the objective lens holder. Behind the soldering point, the device has a moveable wire mounting means which is supported via a spring and a guide in the direction of the mounting device for the actuator base plate and objective lens holder. The threaded wire deposited in the wire mounting means, the wire mounting means having previously been brought up to the mounting device against the resistance of the said spring, is then clamped into a first clamping part, which is behind the opening for mounting the wire in the actuator base plate, seen from the objective lens holder, and subsequently clamped into a second clamping part, which is provided on the wire mounting means. A force or prestressing of the wire which proceeds from the spring force with which the wire mounting means is supported against the mounting device is then exerted on the wire clamped by means of the first and second clamping parts. A different force-producing means can, however, also be used to produce the prestress. Instead of by means of a spring, the force can also be produced pneumatically, hydraulically, magnetically, electro-magnetically or in any other suitable way. In the said embodiment, the spring and the second clamping part form a clamping means for producing prestressing on the wire, and the first clamping part is provided for holding the wire. However, it is also possible, for example, for a roll from which the wire is unreeled to be held so that in the case of such an embodiment the first clamping part is formed by a device for fixing the roll in position. As has already become clear, the invention is not limited to a specific embodiment concerning the means for holding and clamping the wire or the wires. The wire prestressed by the device is then preferably fastened to the actuator base plate and the objective lens holder by means of a soldered joint. In order to connect the wire to the actuator base plate and the objective lens holder, it is also possible to use other known connecting methods such as, for example, welding, adhesive bonding or clamping. However, it is to be ensured that forces resulting from the connecting process do not exceed a prestress exerted on the wire. After the wire has been connected to the actuator base plate and objective lens holder, the wire is severed between the connecting and clamping points, and the operation is repeated with regard to further provided wires, for which the device has appropriate means. The device can, however, also be designed such that one holding and clamping means is used repeatedly, or that a plurality of holding and clamping means is provided in order to permit a plurality of wires to be mounted simultaneously.

After mounting, the wire pick-up with a low tilt of the objective lens and improved guidance properties is then removed from the mounting device.

Figure 2:
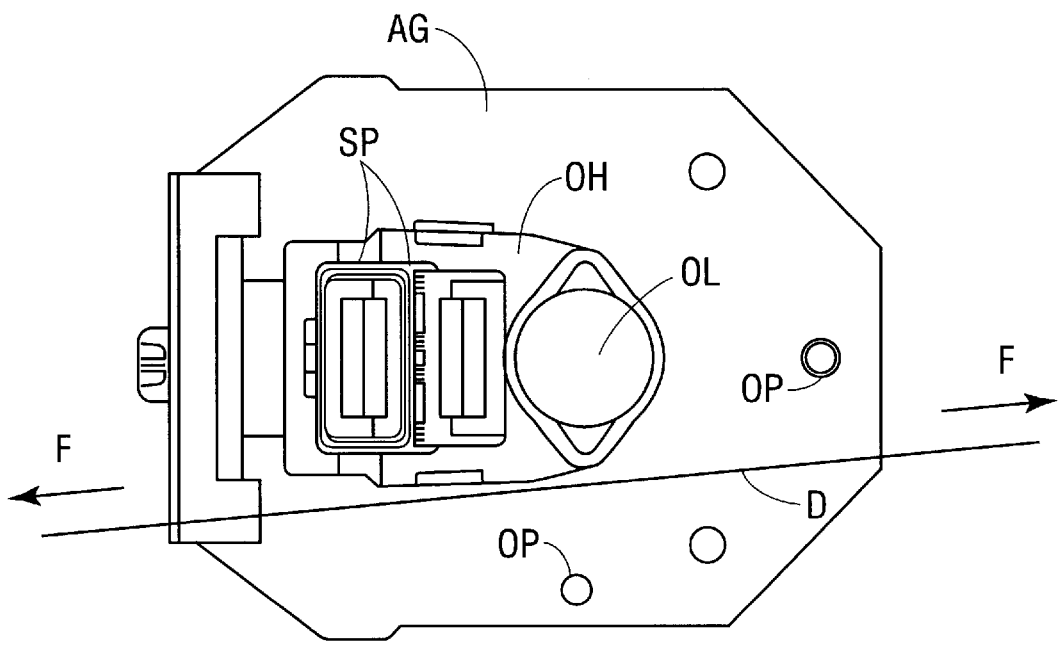
Figure 3:
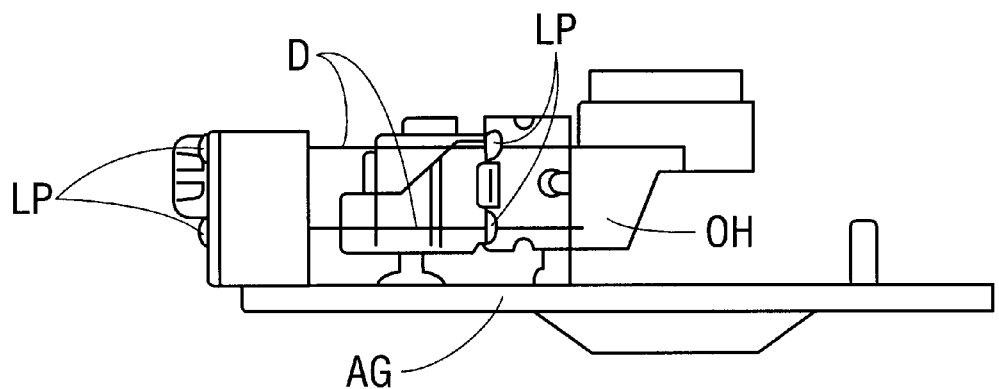
Figure 4:
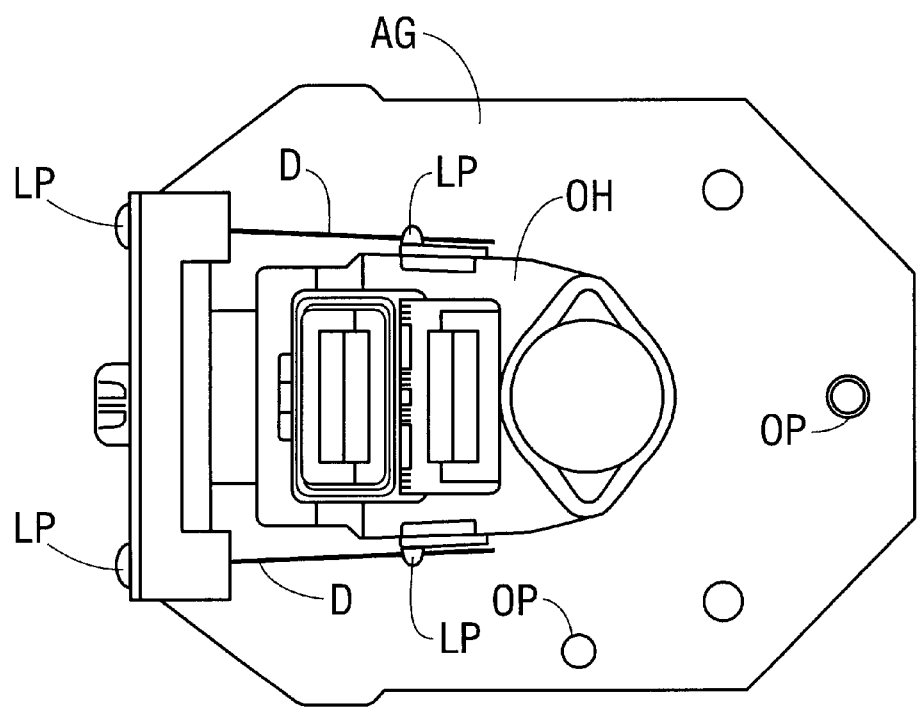
Figure 5:
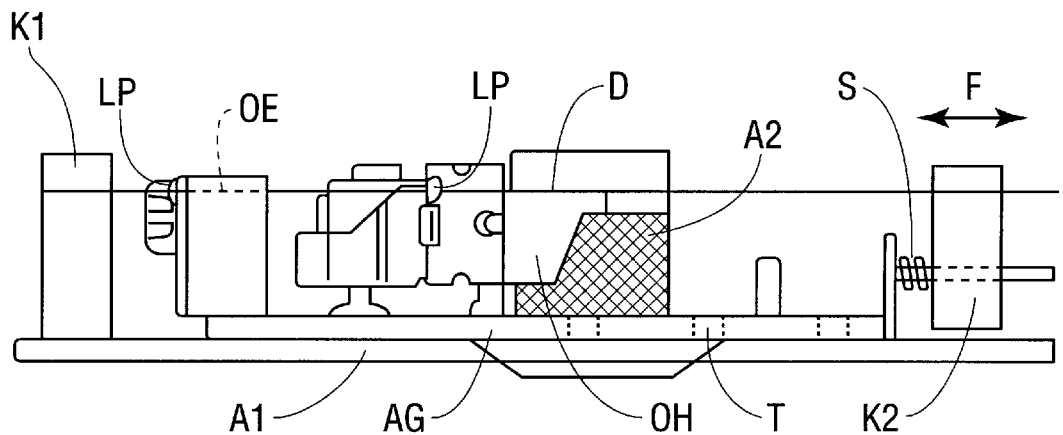
Figure 6:
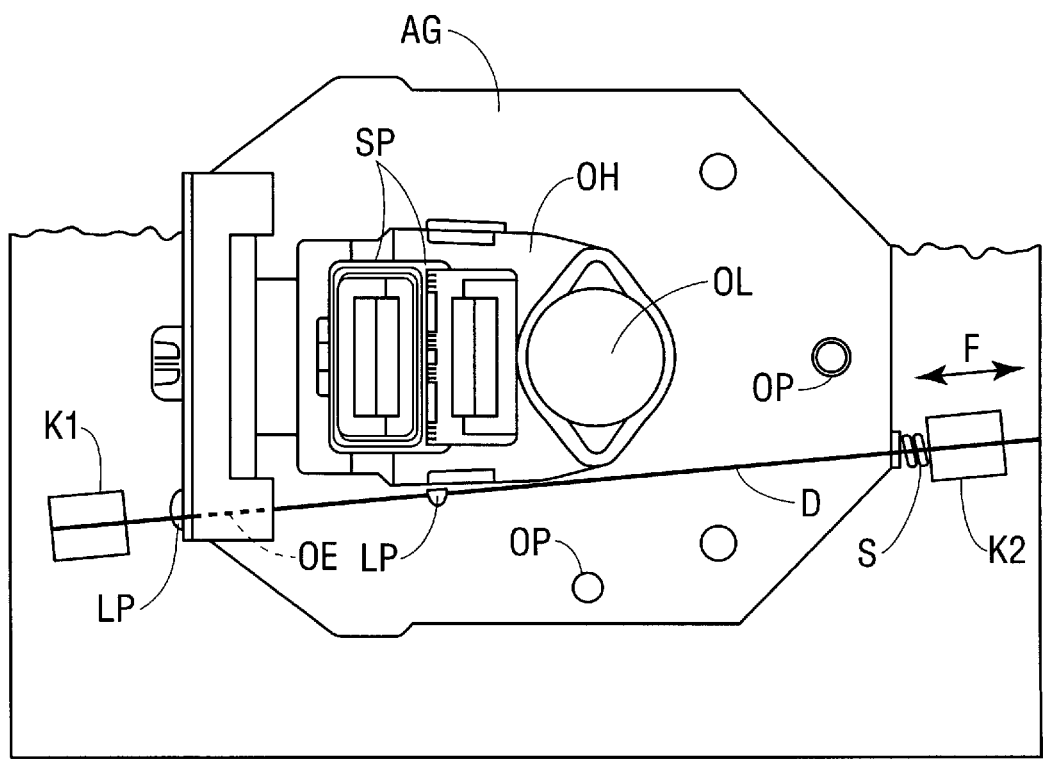

The invention is explained in more detail below in an exemplary embodiment with the aid of drawings, in which, FIG. 1 shows a schematic sketch of a side view for the production of a scanning device for optical recording media, FIG. 2 shows a schematic sketch of a top view for the production of a scanning device for optical recording media, FIG. 3 shows a sketch of a side view of a wire pick-up, FIG. 4 shows a sketch of a top view of a wire pick-up, FIG. 5 shows a schematic sketch of a side view of a device for producing a scanning device for optical recording media, and FIG. 6 shows a schematic sketch of a top view of a device for producing a scanning device for optical recording media.

Reference symbols are used correspondingly in the figures. FIG. 1 represents the schematic sketch of a side view for the production of a scanning device for optical recording media. The optical scanning device comprises an actuator base plate AG and an objective lens holder OH, which for the purpose of producing the optical scanning device according to the invention are to be connected to prestressed wires D as elastic support for the objective lens holder OH. As already mentioned, this is a schematic sketch in which the structural representation of body outlines which are not visible has been disregarded, and a prestress F of the wire D is represented symbolically by means of arrows.

FIG. 2 represents the schematic sketch of a top view for the production of a scanning device for optical recording media in accordance with FIG. 1, in which, in addition, the objective lens OL arranged in a known way on the objective lens holder OH, and the coils SP for focusing and for track guidance are provided with corresponding reference symbols.

Scanning devices for optical recording media in which the elastic support of the objective lens holder OH is realized by means of wires D, are also referred to as so-called wire pick-ups. A corresponding wire pick-up is represented in FIGS. 3 and 4. Such wire pick-ups can be produced relatively cost-effectively, since they require a relatively low outlay on production. However, it is disadvantageous that by comparison with other parallel guidances the wire pick-up has a relatively large tilt of the objective lens OL and disadvantageous guidance properties. The disadvantageous guidance properties consist, in particular, in that different forces are required to deflect the objective lens holder OH or actuator from its rest position, said forces having a disadvantageous influence on the connected control loop, and the objective lens OL having a disadvantageous tilt after being mounted. The following dimensional comparison may be made in order to gain an idea of the accuracy with which the light beam of an optical scanning system can be guided on the information track of a CD. The information track on the CD has a width which is scarcely greater than the hundredth part of a human hair. If the diameter of a CD is compared with a football pitch, the track width corresponds to a rough approximation to the diameter of a hair. In the case of a DVD, the track spacing and track width are reduced by a further order of magnitude. This makes plain that even a slight tilting of the objective lens OL or asymmetrical guidance properties disadvantageously affect the scanning of optical information media. These disadvantages likewise occur when the optical scanning device is used to record information.

In accordance with FIGS. 3 and 4, the elastic support of the objective lens holder OH is formed by four wires D, which connect the objective lens holder OH to the actuator base plate AG. The wires D generally consist of copper wire and are generally connected to the objective lens holder OH and actuator base plate AG by a soldered joint.

In order to avoid the disadvantages of so-called wire pick-ups by comparison with other parallel guidances with regard to tilting of the objective lens OL and asymmetrical guidance properties, it has been established that a lower tilting of the objective lens OL and improved guidance properties are achieved by prestressing the wires D of the wire pick-up, which form the elastic support for the objective lens holder OH. Prestressing the wires D of the wire pick-up relates, in particular, to the process of producing or mounting the wire pick-up, in which the objective lens holder OH is connected to the actuator base plate AG. The wires D used for this purpose likewise generally supply power to the coils SP which are arranged on the objective lens holder OH and serve the purpose of focusing and track guiding. The wires D, which therefore preferably consist of copper, are preferably connected to the objective lens holder OH and the actuator base plate AG by soldering. The solidified solder exercises on the wires D, which generally have a diameter in the region of 0.1 mm, forces which are counteracted by means of a mechanical prestress F on the wires D. In a preferred embodiment, a prestress of 20 grammes is used as effective means for producing scanning devices for optical recording media with a low outlay and a comparatively low tilt of the objective lens, and improved guidance properties. The value of the prestress F is a function of numerous influencing factors such as, for example, the properties of the wire D used and of the solder. The diameter of the wire D and the size of the soldering points LP which is used also substantially influence the prestress F to be applied. It has been established that, as a rule, a prestress F in the region of one hundred to two hundred grammes per millimeter of diameter of the wire D in the specified diameter range suffices for producing the scanning devices for optical recording media with a lower tilt and improved guidance properties.

The proposed method of prestressing the wires D of the wire pick-up during mounting advantageously counteracts forces which result from the process of connecting the objective lens holder OH to the actuator base plate AG. The method specified can thus be used to produce cost effective scanning devices for optical recording media which as far as possible avoid the disadvantages of known wire pick-ups despite being designed as a wire actuator.

FIGS. 5 and 6 represent the schematic sketch of a device for producing a scanning device for optical recording media according to the abovenamed method. The device comprises a mounting device, which in accordance with FIG. 5 has a first mount A1 for the actuator base plate AG and a second mount A2 for the objective lens holder OH. The first mount A1 for the actuator base plate AG is preferably formed with the aid of pins T which are arranged on a plate and engage in openings OP in the actuator base plate AG which are provided for later fastening and aligning of the actuator base plate AG on a coarse drive. The openings OP in the actuator base plate AG are, for example, the openings OP represented in FIGS. 2, 4 and 6. The objective lens holder OH, which generally does not have such openings, is held on the second mount A2 by means of a hold-down (not represented), in order to align it with high accuracy and immovably relative to the actuator base plate AG.

In order to connect the objective lens holder OH to the actuator base plate AG, a first wire is threaded into an opening OE provided in the actuator base plate in an angled region and guided in the direction of a soldering point LP provided on the objective lens holder OH. Behind the soldering point LP, the device has a moveable wire mounting means which is supported via a spring S and a guide in the direction of the mounts A1, A2 for the actuator base plate and objective lens holder OH. The mounts A1 and A2 form a mounting device. The threaded wire deposited in the wire mounting means formed by a second clamping part K2, the wire mounting means having previously been brought up to the mounting device against the resistance of the said spring S, is then clamped into a first clamping part K1, which is behind the opening OE for mounting the wire D in the actuator base plate AG, seen from the objective lens holder OH, and subsequently clamped into the second clamping part K2. A prestressing F of the wire which proceeds from the force of the spring S with which the wire mounting means is supported against the mounting device is then exerted on the wire D clamped by means of the first and second clamping parts K1, K2. The wire D prestressed by the device is then preferably fastened to the actuator base plate AG and the objective lens holder OH by means of a soldered joint. In order to connect the wire D to the actuator base plate AG and the objective lens holder OH, it is also possible to use other known connecting methods such as, for example, welding, adhesive bonding or clamping. However, it is to be ensured that forces resulting from the connecting process do not exceed a prestress exerted on the wire D. After the wire has been connected to the actuator base plate AG and objective lens holder OH, the wire is severed between the connecting and clamping points, and the operation is repeated with regard to further provided wires or carried out simultaneously.

Subsequently, the scanning device for optical recording media or the wire pick-up with a low tilt of the objective lens and improved guidance properties can be removed from the device.

We claim:

1. Method for producing a scanning device for optical recording media, comprising the steps:

directly connecting wires to an actuator base plate and to an objective lens holder to provide elastic support between said actuator base plate and said objective lens holder;

said connecting step including the step of exerting, during the connecting process, a prestress on said wires which exceeds forces resulting from the connecting process of said wires to said actuator base plate and said objective lens holder.

2. Method according to claim 1, wherein the prestress on said wires is produced by a spring in an assembly fixture.

3. Method according to claim 1, wherein said connecting step includes soldering said wires to the actuator base plate and the objective lens holder.

4. Method according to claim 1, wherein said connecting step includes adhesively bonding said wires to the actuator base plate and the objective lens holder.

5. Method according to one of claims 1–4, wherein the prestress on said wires is a tensile force of one hundred to two hundred grams per millimeter of diameter of the wire.

6. Device for producing a scanning device for optical recording media, comprising:

wires connecting an actuator base plate to an objective lens holder to provide elastic support between said actuator base plate and said objective lens holder;

a mounting device for the actuator base plate and objective lens holder;

apparatus for holding a wire adjacent to said objective lens holder and said actuator base plate and for prestressing said wire immediately prior to connecting the wire directly to the objective lens holder and the actuator base plate.

7. Device according to claim 6, wherein a first mount of the mounting device plate has at least one pin which engages in an opening in the actuator base plate which is provided for later fastening or aligning of the actuator base plate on a coarse drive of the scanning device for optical recording media.

8. Device according to claim 6, wherein a hold-down is provided for holding the objective lens holder on a second mount of the mounting device.

9. Device according to claim 6, wherein said apparatus for producing a prestress on the wire is a spring by which a wire mounting means is supported against the mounting device.

10. Device according to claim 6, wherein said apparatus for prestressing said wire on the wire is a force-producing means which produces forces which are greater than the forces resulting from the connecting process.

* * * * *